UNITED STATES PATENT OFFICE.

KARL SCHIRMACHER, OF SODEN, GERMANY, ASSIGNOR TO FARBWERKE, VORM. MEISTER, LUCIUS & BRÜNING, OF HÖCHST-ON-THE-MAIN, GERMANY.

BLACK DISAZO DYE AND PROCESS OF MAKING SAME.

SPECIFICATION forming part of Letters Patent No. 680,283, dated August 13, 1901.

Application filed May 11, 1901. Serial No. 59,809. (Specimens.)

*To all whom it may concern:*

Be it known that I, KARL SCHIRMACHER, Ph. D., a citizen of the Empire of Germany, residing at Soden, near Höchst-on-the-Main, in the Empire of Germany, have invented certain new and useful Improvements in the Manufacture of Disazo Dyestuffs, of which the following is a specification.

I have found that from ortho-ortho-diamido-para-phenolsulfonic-acid dyestuffs may be obtained of the general formula

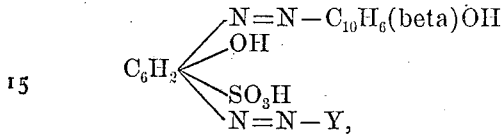

wherein Y means a phenol or amin of benzene, naphthalene, or their sulfonic acids. The process consists in combining the tetrazotized diamidophenolsulfonic acid with beta-naphthol and then with a second component—such, for instance, as alpha-naphthol, resorcinol, 2.7-dioxynaphthalene, 2.7, 2.6, 1.4, or 1.7-naphtholsulfonic acid, naphtholdisulfonic acid R, 1.8.4-dioxynaphthalenesulfonic acid S, 1.4 and 2.6-naphthylaminsulfonic acid, amidonaphtholsulfonic acid G. The disazo dyestuffs thus obtained are black powders soluble in water to a blue solution, their acid dyeings on wool being red-brown to brown, which on treatment with chromates turn to black shades. These dyeings are distinguished by great fastness.

I illustrate my process by the following example: Twenty kilos of ortho-ortho-diamidophenolsulfonic acid are transformed with fourteen kilos of nitrite and fifty kilos of hydrochloric acid into the tetrazo compound. The mineral acid is then neutralized with sixty-eight kilos of sodium acetate, to which is added a solution of 16.7 kilos of the sodium salt of beta-naphthol. After twenty-four hours the mass is run into a solution of 24.5 kilos of the sodium salt of 2.6-naphtholsulfonic acid and forty-five kilos of sodium carbonate. After stirring thirty-six hours the solution is heated to 70° to 80° centigrade, allowed to cool, and filtered.

When dry, the dyestuff is a black powder, soluble in water to a blue solution. It dyes wool in an acid-bath deep brown and the dyeing turns to blue-black on subsequent treatment with chromates.

Having now described my invention, what I claim is—

1. The herein-described process for the manufacture of disazo dyestuffs of the general formula:

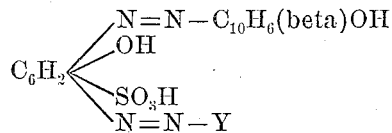

wherein Y means a phenol or amin of benzene, naphthalene or their sulfonic acids, which consists in combining ortho-ortho-diamido-para-phenolsulfonic acid with beta-naphthol and then with another azo component, substantially as set forth.

2. As products the disazo dyestuffs of the general formula:

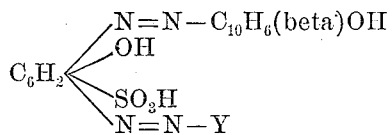

being black powders soluble in water to a blue solution, dyeing wool in an acid-bath red-brown to brown, their dyeings turning to black shades on subsequent treatment with chromates.

3. The herein-described process for the manufacture of a disazo dyestuff which consists in combining ortho-ortho-diamido-para-phenolsulfonic acid with one molecular proportion of beta-naphthol and then with one molecular proportion of 2.6-naphtholsulfonic acid, substantially as set forth.

4. As product the dyestuff which may be obtained by combining ortho-ortho-diamido-para-phenolsulfonic acid with one molecular proportion of beta-naphthol and one molecular proportion of 2.6-naphtholsulfonic acid, being a black powder soluble in water to a blue solution, dyeing wool in an acid-bath deep brown, its acid dyeing turning blue-black on subsequent treatment with chromates.

In testimony that I claim the foregoing as my invention I have signed my name in presence of two subscribing witnesses.

KARL SCHIRMACHER.

Witnesses:
 ALFRED BRISBOIS,
 BERNHARD LYDECKER.